United States Patent [19]

Huang

[11] Patent Number: 5,511,314

[45] Date of Patent: Apr. 30, 1996

[54] GARDEN SHEARS

[76] Inventor: Shoei-Shin Huang, No. 668, Sec. 4, Yen Hai Rd., Fu Shing Hsiang, Chang Hua Hsien, Taiwan

[21] Appl. No.: 491,573

[22] Filed: Jun. 16, 1995

[51] Int. Cl.⁶ .................................................... B26B 13/00
[52] U.S. Cl. .................... 30/251; 30/249; 81/314
[58] Field of Search ............................ 30/249, 250, 251, 30/244, 92; 81/314

[56] References Cited

U.S. PATENT DOCUMENTS

| | | |
|---|---|---|
| 3,273,240 | 9/1966 | Florian ........................................ 30/251 |
| 4,084,317 | 4/1978 | Nakamura et al. ................... 30/251 X |
| 4,094,064 | 6/1978 | Nishikawa et al. ................... 30/251 X |
| 4,674,184 | 6/1987 | Anderson ................................ 30/251 X |
| 5,159,757 | 11/1992 | Weid et al. ................................. 3/251 |
| 5,351,584 | 10/1994 | Warheit .................................. 81/314 X |

Primary Examiner—Hwei-Siu Payer
Attorney, Agent, or Firm—Browdy and Neimark

[57] ABSTRACT

A pair of garden shears comprises a fixed jaw, a movable jaw, a rocking arm fastened pivotally with the fixed jaw, a connection rod pivoted with the rocking arm, and a fastening cover fastened at the open end thereof with the rocking arm and provided at the closed end thereof with a pin engageable at one end thereof with a tension spring by which a spindle of the connection rod is caused to move so as to be retained in the grooves of a toothed retainer of the movable jaw when the fixed jaw and the movable jaw work against each other to bring about a shearing action.

1 Claim, 3 Drawing Sheets

GARDEN SHEARS

FIELD OF THE INVENTION

The present invention relates generally to a gardening implement, and more particularly to an improved garden shears.

BACKGROUND OF THE INVENTION

The conventional garden shears is generally a handy tool for use in pruning a short garden plant; nevertheless it is not an effective tool for cutting away the larger branch or shoot of a tree or shrub. In the process of pruning a rigid or larger branch or shoot of the garden tree or shrub, a gardener is often frustrated by the fact that the tree branch can not be cut away by one scissors action of the garden shears, and that the blades of the garden shears can not be aligned easily with the first pruning mark when a second scissors action is called for, and further that the tree branch held by the blades of the shears tends to slip toward the outer edge of the shears blade.

SUMMARY OF THE INVENTION

It is therefore the primary objective of the present invention to provide a garden shears with an adjustment means enabling the shears blades to remain at the position of the first cutting mark when the hand grips of the shears are released to facilitate the repositioning of the hand.

The foregoing objective of the present invention is attained by a garden shears comprising a fixed jaw, a movable jaw, a rocking arm pivoted with the fixed jaw, a connection rod pivoted with the rocking arm, and a fastening cover fastened at the open end thereof with the rocking arm and provided at the closed end thereof with a pin engageable at one end thereof with a tension spring by means of which the spindle of the connection rod is caused to move so as to be retained securely in the grooves of the toothed retainer of the movable jaw when the fixed jaw and the movable jaw work against each other to bring about a shearing action.

The foregoing objective, features, functions, and advantages of the present invention will be more readily understood upon a thoughtful deliberation of the following detailed description of the present invention in conjunction with the accompanying drawings.

DETAILED DESCRIPTION OF THE INVENTION

Figure 1:
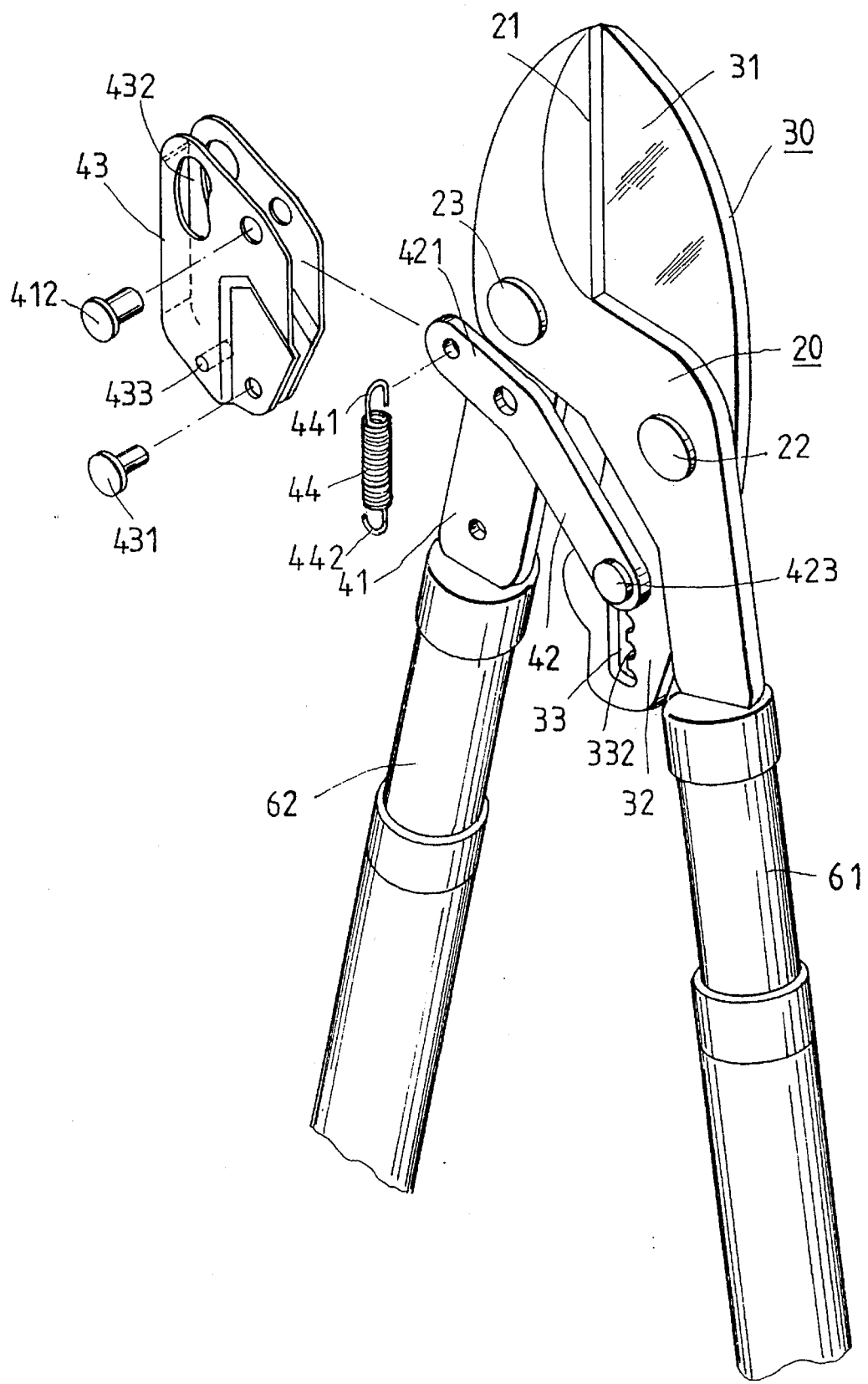
FIG. 1 shows a partial exploded view of a preferred embodiment of the present invention.
Figure 5:
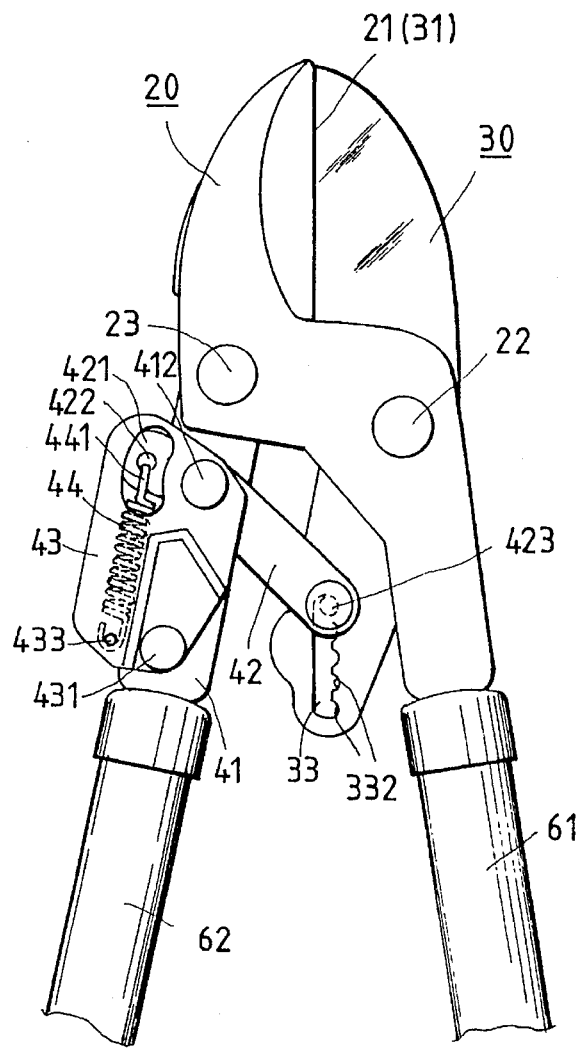
FIG. 5 shows a schematic view of the present invention at the time when the cutting action is completed.
Figure 2:
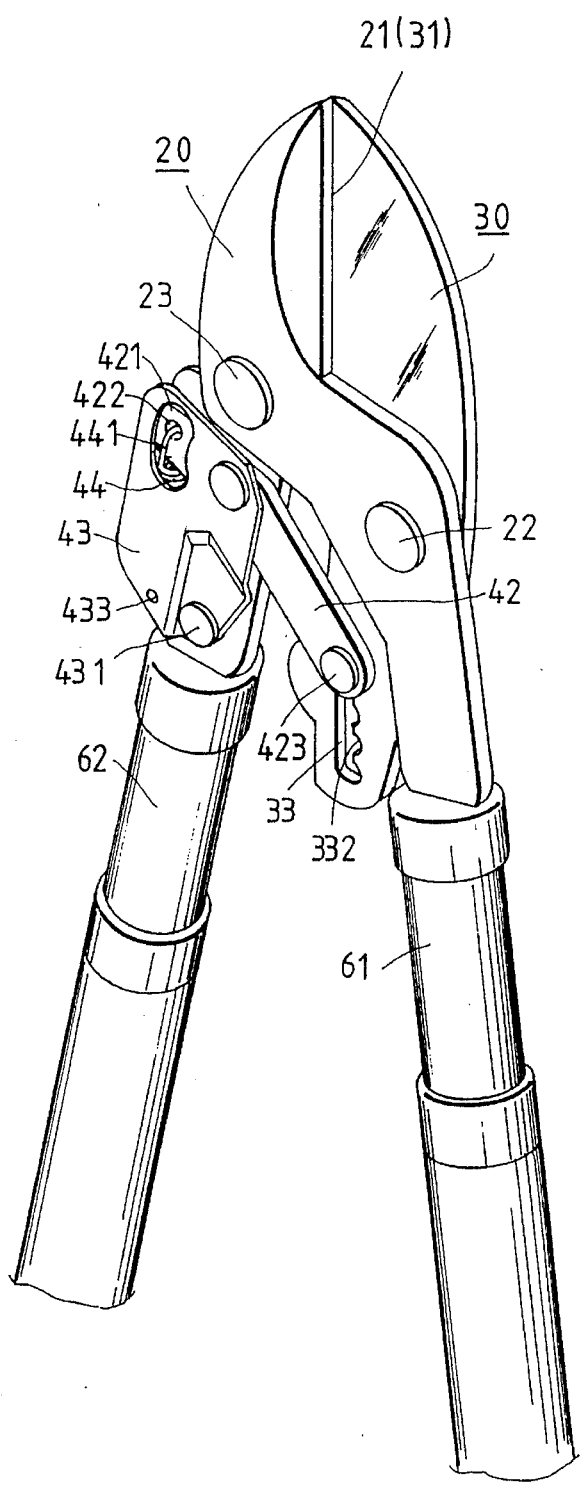
FIG. 2 shows a perspective view of the preferred embodiment in combination according to the present invention.

As shown in FIGS. 1 and 2, a pair of garden shears embodied in the present invention comprises mainly a fixed jaw 20, movable jaw 30, a rocking arm member, and a spring 44.

The fixed jaw 20 is provided at the upper end thereof with a cutting face 21 and at the midsegment thereof with a first pivoting pin 22 and a second pivoting pin 23. The fixed jaw 20 is fastened at the lower end thereof with a handle 61.

The movable jaw 30 of a steel material is provided at the upper portion thereof with a blade portion 31 and at the lower end thereof with a support arm portion 32 which is in turn provided with a toothed retainer 33 having a plurality of arcuate grooves 332. The movable jaw 30 is fastened pivotally with the fixed jaw 20 such that the movable jaw 30 can be moved in relation to the cutting face 21 of the fixed jaw on the first pivoting pin 22 serving as a fulcrum.

The rocking arm member comprises a rocking arm 41, a connection rod 42, a fastening cover 43, and a spring 44.

The rocking arm 41 is fastened pivotally at the top end thereof with the second pivoting pin 23 of the fixed jaw 20 and is connected at the bottom end thereof with a handle 62.

The connection rod 42 is fastened pivotally at the midsegment thereof with a pivoting pin 412 of the rocking arm 41 and is provided at one end thereof with a support arm 421 which has a through hole 422. The connection rod 42 is further provided at another end thereof with a spindle 423 which can be retained in the arcuate grooves 332 of the toothed retainer 33 of the movable jaw 30.

The fastening cover 43 has a C-shaped cross section and is fastened at the open end thereof with the rocking arm 41 and the connection rod 42. The fastening cover 43 is fastened at the top end thereof with the pivoting pin 412 of the rocking arm 41 and is further fastened at the bottom end thereof with the rocking arm 41 by means of a fastening element 431. The fastening cover 43 is provided respectively at the upper and the lower ends of the inner side of the closed end thereof with an oblong through hole 432 and a pin 433.

The tension spring 44 is provided at the top end thereof with a hook 441 engageable with the through hole 422 of the connection rod 42 and is further provided at the bottom end thereof with a hooked portion 442 engageable with the pin 433 of the fastening cover 43. The tension spring 44 is intended to force the rocking arm 41 to move outwards.

Figure 3:
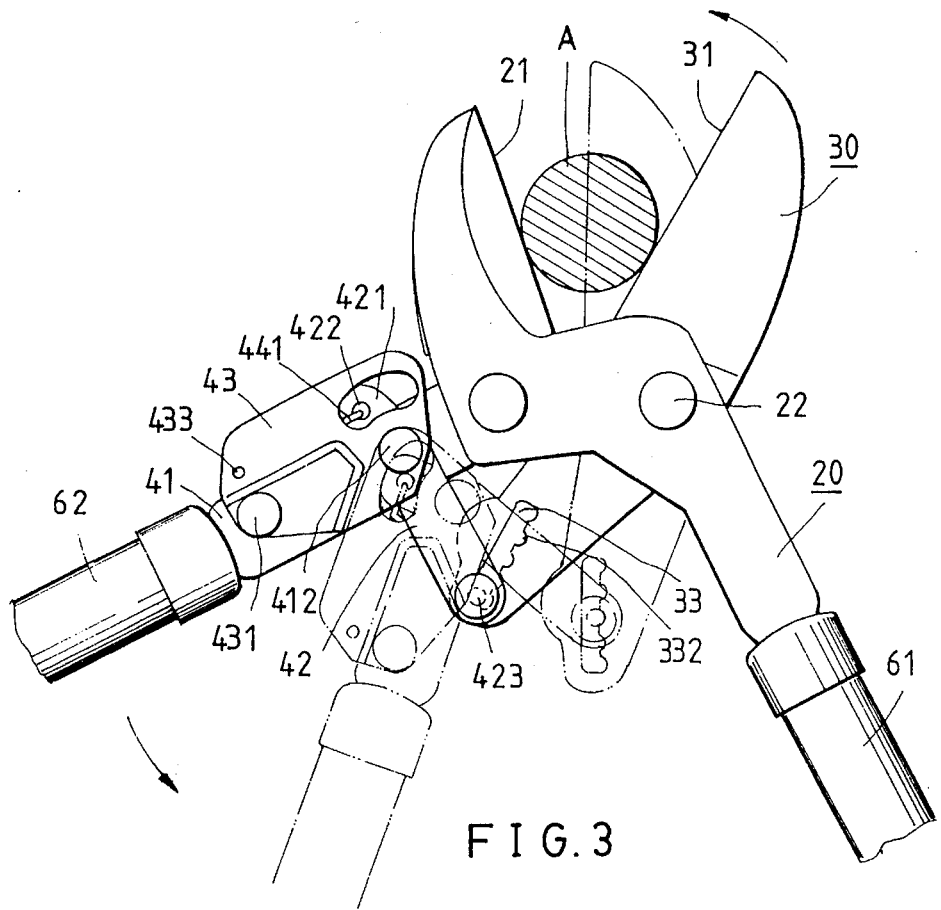
FIG. 3 shows a schematic view of the present invention at work.
Figure 4:
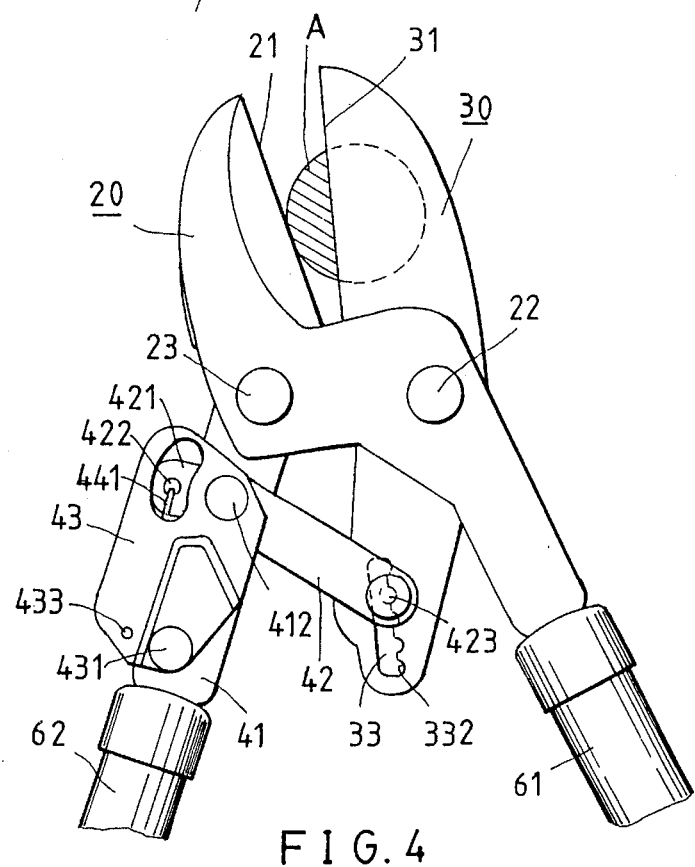
FIG. 4 shows another schematic view of the present invention at work.

In operation, two handles 61 and 62 are moved in opposite directions so that the handles 61 and 62 remain apart appropriately in such a manner that two blades 21 and 31 hold therebetween a tree branch A, as shown in FIG. 3. The handles 61 and 62 are then exerted on oppositely by force so as to cause the rocking arm 41 to press inwardly, thereby causing the movable jaw 30 to swivel counterclockwise. In the meantime, the spindle 423 of the connection rod 42 is located at the bottom end of the toothed retainer 33, as shown in the solid lines of FIG. 3. As the rocking arm 41 is exerted on by a pressure from the handle 62, the movable jaw 30 is actuated by the rocking arm 41 to move to a position indicated by the dotted lines as shown in FIG. 3. It is rather difficult to exert any further pressure on the handle 62 in view of the fact that the shearing resistance is rather great. As a result, the handle 62 must be released so as to permit the spring 44 to force the rocking arm 41 to move outwards. The blade 31 of the movable jaw 30 has made an incision into the tree branch A. When one end of the connection rod 42 is moved outwards, the spindle 423 located at another end of the connection rod 42 is moved upwards along with the toothed retainer 33. When the handle 62 is exerted on by a force again, the spindle 423 of the connection rod 42 is retained in the next arcuate groove 332, as indicated by the solid lines in FIG. 4. The movable jaw 30 can be therefore exerted on by a force for the second time so as to complete the second scissors action. If the situation calls for another round of shearing action, the handle 62 is released once again so as to allow the spindle 423 to move into another arcuate groove 332 of the toothed retainer 33. Such a shearing process as described above is repeated until the tree branch A is cut away.

It must be noted here that the present invention is provided with the tension spring 44, which serves to facilitate the process in which the spindle 423 is retained by the toothed retainer 33 of the movable jaw 30. In addition, the fastening cover 43 serves to shield the tension spring 44.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claim.

What is claimed is:

1. A pair of garden shears comprising:

a fixed jaw provided integrally at an upper portion thereof with a cutting part and at a midsegment thereof with a first pivoting pin and a second pivoting pin, said fixed jaw further provided with a lower segment fastened with a hand grip;

a movable jaw fastened pivotally with said first pivoting pin of said fixed jaw and provided integrally at an upper portion thereof with a cutting blade, said movable jaw further provided at a lower end thereof with a support arm having a toothed retainer;

a rocking arm fastened pivotally at a top end thereof with said second pivoting pin of said fixed jaw and further fastened at a bottom end thereof with a hand grip;

a connection rod fastened pivotally with said rocking arm and provided at one end thereof with a spindle engageable with said toothed retainer of said support arm of said movable jaw, said connection rod further provided at another end thereof with a support arm having a through hole;

a fastening cover having a C-shaped cross section and fastened at an open end thereof with said rocking arm, said fastening cover provided at a closed end thereof with a pin; and a tension spring provided at a top end thereof with a retaining means engageable with said through hole of said support arm of said connection rod, said tension spring further provided at a bottom end thereof with a retaining means engageable with said pin of said fastening cover.

* * * * *